United States Patent [19]

Schiatter

[11] 3,795,136

[45] Mar. 5, 1974

[54] VIBRATION DENSITOMETER APPARATUS

[75] Inventor: Gerald Lance Schiatter, Boulder, Colo.

[73] Assignee: International Telephone and Telegraph Corporation, New York, N.Y.

[22] Filed: Sept. 18, 1972

[21] Appl. No.: 289,770

[52] U.S. Cl. .......... 73/32
[51] Int. Cl. .......... G01m 9/10
[58] Field of Search .......... 73/30, 32; 330/26–28, 69

[56] References Cited

UNITED STATES PATENTS

| | | | |
|---|---|---|---|
| 3,566,266 | 2/1971 | Bloom | 330/28 |
| 3,447,095 | 5/1969 | McMillan | 330/69 |
| 2,903,885 | 9/1959 | Kritz | 73/32 |
| 3,598,111 | 8/1971 | Kahn | 73/67.1 |
| 3,636,456 | 1/1972 | Wright | 73/67.1 |

*Primary Examiner*—Richard C. Queisser
*Assistant Examiner*—Arthur E. Korkosz
*Attorney, Agent, or Firm*—A. Donald Stolzy

[57] ABSTRACT

A preamplifier for a vibration densitometer for connection from a piezoelectric crystal and including a differential amplifier having a negative feedback capacitor. Noise discrimination is unexpectedly increased tenfold. The densitometer is also less temperature sensitive. A voltage divider having a tap is employed to set the noninverting input of the amplifier at a desired fixed D.C. reference level. A negative feedback resistor prevents amplifier drif. A bypass capacitor connected in parallel with one leg of the voltage divider references one A.C. output lead to ground.

4 Claims, 10 Drawing Figures

VIBRATION DENSITOMETER APPARATUS

This application is a continuation-in-part of copending U.S. Pat. application Ser. No. 244,800, filed Apr. 17, 1972, filed by G. L. Schlatter for VIBRATION DENSITOMETER APPARATUS, now abandoned. The benefit of the filling date of said copending application is, therefore, claimed for the subject matter in this application which is common to that is said copending application.

BACKGROUND OF THE INVENTION

This invention relates to vibration densitometers, and more particularly, to a preamplifier for connection from a piezoelectric crystal in a densitometer or in other environments.

Due to the fact that a vibration densitometer is normally subjected to temperature fluctuations and due to the fact that one requires mechanical vibration for operation, temperature insensitivity and discrimination against noise are important.

SUMMARY OF THE INVENTION

In accordance with the device of the present invention, a capacitor is connected from the output to the inverting input of a differential amplifier. This connection unexpectedly provides a tenfold improvement in noise discrimination. Temperature insensitivity is also improved.

If desired, biasing resistors, feedback and otherwise, may be employed to prevent amplifier drift.

Another feature of the invention utilizes a bypass capacitor to level shift the A.C. potential of one of the amplifier output leads.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
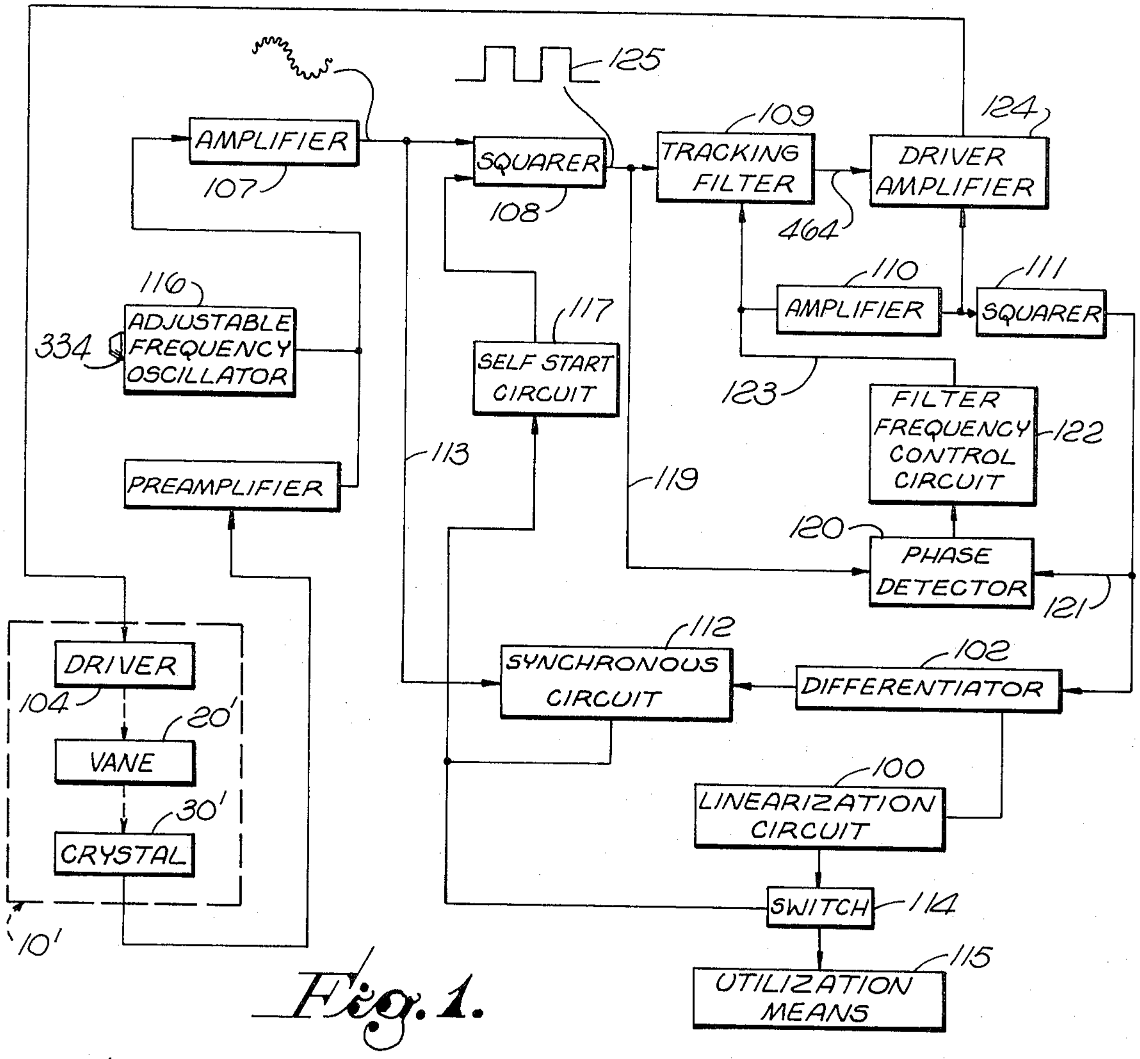
FIG. 1 is a block diagram of a densitometer constructed in accordance with the present invention.

A densitometer is illustrated in FIG. 1 comprising a probe 10′ including a magnetostrictive driver 14, a van 20′ and a piezoelectric crystal 30′.

If desired, probe 10′ may be identical to that disclosed in copending U.S. Pat. applications Ser. Nos. 65,371 and 187,948 and filed Aug. 20, 1970, and Oct. 12, 1971, respectively, for DENSITOMETER and FLUID SENSING SYSTEMS, respectively, both by C. E. Miller and G. L. Schlatter. Said copending U.S. Pat. application Ser. No. 187,948 is abandoned. Said U.S. Pat. application Ser. No. 65,371 is now issued U.S. Pat. No. 3,677,067. The entire disclosures of said copending applications are hereby incorporated by this reference hereto into the present application the same as though set forth in full herein hereat and the benefit of the filing dates of said copending applications are claimed for this application. The same is true of copending U.S. Pat. application Ser. No. 131,131, filed Apr. 5, 1971, for DENSITOMETER AND CALIBRATION METHOD AND APPARATUS THEREFORE by G. L. Schlatter, now abandoned. This application also contains some subject matter common to said copending applications.

The output of crystal 30′ is connected to a preamplifier 10. An amplifier 107, a squarer 108, a tracking filter 109, an amplifier 110 and a squarer 111 are connected in succession from preamplifier 10 to a differentiator 102. Outputs of the differentiator 102 are connected to a synchronous detector 112 and to a linearization circuit 100, respectively. Synchronous detector 112 also receives an input over a lead 113 from the output of amplifier 107. The output of the synchronous detector 112 controls a switch 114 connected between linearization circuit 100 and utilization means 115. An adjustable frequency oscillator 116 is connected to the input of amplifier 107. A self-start circuit 117 is connected from synchronous detector 112 to squarer 108. The output of squarer 108 is impressed over a lead 119 on a phase detector 120. Phase detector 120 receives a second input on a lead 121 connected from the output of squarer 111. A filter frequency control circuit 122 is connected from the output of phase detector 120 to the control input of tracking filter 109. The output lead 123 of circuit 122 forms both the control input of filter 109 and the filtered output thereof.

A driver amplifier 124 is connected from another output of filter 109 and from the output of amplifier 110 to drive 104.

Preamplifier 10 contains a differentiator which produces an output signal 90° out of phase with the output signal of crystal 30′. The output signal of tracking filter 109, introduced to amplifier 110, is also 90° out of phase with the input signal to tracking filter 109 from squarer 108. The two 90° phase shifts produced in preamplifier 10 and tracking filter 109 can help or make it possible to connect the output of drive amplifier 124 to driver 104 in a manner to obtain resonance. That is, vane 20′ is vibrated at its natural resonant frequency by energizing driver 104 with a level shifted alternating voltage in phase with the output of crystal 30°. The current flowing in driver 104 may be a level shifted sine wave, but it always flows in one direction only.

Oscillator 116 is employed in calibration.

Circuit 117 is employed to insure self-starting. Synchronous detector 112 causes switch 114 to clamp the output of circuit 110 to a constant value when resonance does not occur.

Utilization means 115 may take any of several desired forms. When switch 114 passes the output of circuit 100, this output is directly proportional to the density of the fluid in which the probe 10' is submerged. Utilization means 115 may thus be a voltmeter or ammeter calibrated in density, if desired. Alternatively, utilization means 115 may be a process controller or otherwise.

Tracking filter 109 and linearization circuit 100 may or may not have multiple ranges, as desired. If so, the resonant vibration of vane 20' may occur anywhere within two or more bands depending upon in what fluid vane 20' is submerged. If such is the case, it may be desirable for self-state circuit 117 to produce an output signal of a frequency near or in a band of interest. Alternatively, the output signal frequency of self-start circuit 117 may be varied throughout the band of interest. The range of the frequency sweep of the output signal of circuit 117 may be shifted from one to any one of one or more other bands, if desired. However, as disclosed hereinafter, the frequency of the alternating output signal of self-start circuit 117 may also be varied gradually or in steps from the lowermost limit of the lowermost band of operation of tracking filter 109 to the uppermost limit of the uppermost band of tracking filter 109.

The densitometer of FIG. 1 is, at least in part, an electromechanical oscillator. The crystal 30' is the pickoff, the output of which is amplified and impressed upon driver 104. However, there is, at times, due to pipe noise and otherwise, difficulty in starting the said electromechanical oscillator. The self-start circuit 117 automatically starts vane 20' vibrating at its natural resonant frequency for the density of the fluid in which it is submerged.

Self-start circuit 117 may include two oscillators. One of the oscillators oscillates at a lower frequency than the oscillation frequency of the other oscillator. The higher frequency is thus frequency modulated in sinusoidal, saw-tooth or any other similar periodic wave fashion. When resonance is reached, self-start circuit 117 is turned off by the output of synchronous detector 112.

Driver amplifier 124 receives an additional input over a lead 464 from tracking filter 109. The input on lead 464 adjusts the phase of the alternating component of the output signal of driver amplifier 124 and by a simple resistor connection, unexpectedly makes the alternating component in phase with the output signal of crystal 30° over a band of frequencies of, for example, from 2.0 to 5.0 kilohertz.

According to an outstanding feature of the invention, the driver amplifier 124 impresses a signal on driver 104 having an alternating component which is in phase with the output signal of crystal 30'. The advantage is that resonance occurs at maximum efficiency. That is, when the output voltage of driver amplifier 124 has an alternating component is phase with the output of crystal 30', the amplitude of the output of crystal 30' is maximum. This is true even though is true even though the alternating component of the current through driver 104 lags the alternating component of the input to driver 104 by about 70°, and this current phase does not change substantially throughout, for example, an entire frequency range of 2.0 to 5.0 kilohertz.

Driver amplifier 124 also has a voltage and current offset. This makes the output of crystal 30' of the same frequency as that of the output of driver amplifier 124. The current in driver 104 always flows in one direction. That is, it is more or less pulsating D.C. Typically, the output voltage of driver amplifier 124 is a sine wave having a peak voltage of about 25 volts, but an average value of from, for example, about 0.1 to 0.2 volt.

Another feature includes means for maintaining the average value of the current in driver 104 constant and independent of its impedance or resistance. Reliable operation is thus assured even at cryogenic temperatures. This overcomes the problem of the D.C. resistance of the coil of driver 104, not shown in FIG. 1, dropping considerably at cryogenic temperatures.

Notwithstanding the foregoing, it will be appreciated that the densitometer of FIG. 1 may be used in many applications and is not limited to those disclosed herein. Further, the densitometer of the present invention may be used in providing an analog voltage or current directly proportional to either gas or liquid density for any purpose, control, indication or otherwise.

OPERATION OF THE DENSITOMETER SHOWN IN FIG. 1

In the operation of the densitometer of FIG. 1, calibration is accomplished by adjustment of oscillator 116. Operation is then started when power is supplied. Circuit 117 then supplies an alternating output signal to squarer 108 which varies in frequency over a range of the instrument. When resonance is found, synchronous detector 112 stops oscillator 117 and tracking filter 109 follows the resonant signal. The output of tracking filter 109 is impressed upon driver amplifier 124 through amplifier 110 to cause the said electromechanical oscillator to oscillate. Vane 20' will then vibrate in one of its modes of vibration at a frequency which is a known function of the density in which it is submerged. Linearization circuit 100 then produces an output voltage and/or current analog directly proportional to density. This is impressed through switch 114 on the utilization means 115.

Switch 114 may provide a zero or other voltage or current to utilization means 115, if desired, during such times that resonance does not occur. On an indicator, it thus can be determined that the instrument is not properly indicating density. Synchronous detector 112 produces an output signal. This selfsame output signal may be employed to operate both switch 114 and to start and stop self-start circuit 117.

Figure 2:
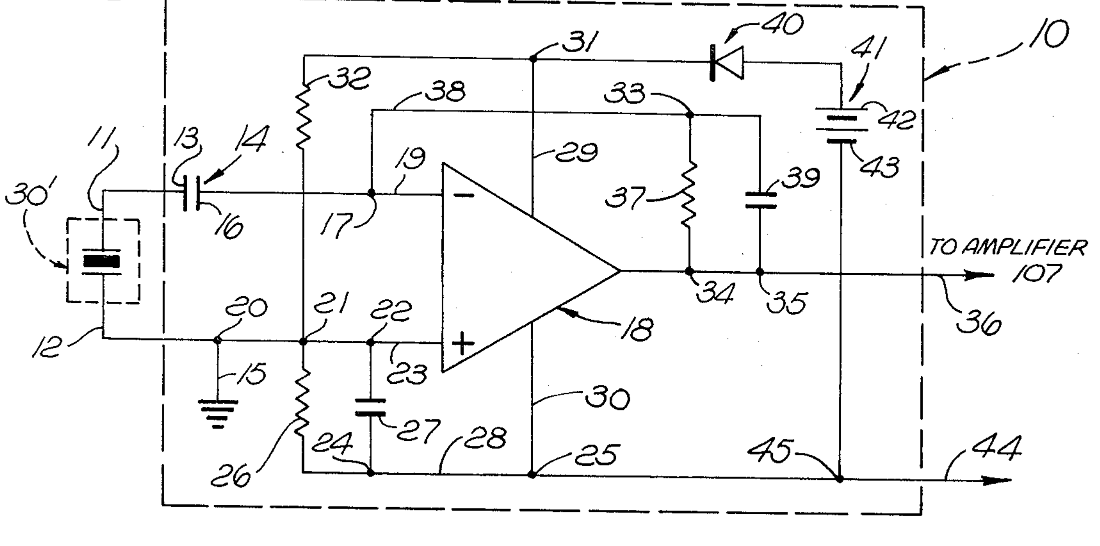
FIG. 2 is a schematic diagram of a preamplifier shown in FIG. 1.

Preamplifier 10 is again shown in FIG. 2 connected from crystal 30'Crystal 30' has leads 11 and 12 connected therefrom to an electrode 13 of a capacitor 14, and to ground at 15, respectively. Capacitor 14 has an electrode 16 connected to a junction 17. Junction 17 is connected to the inverting input of an entirely conventional differential amplifier 18 via a lead 19.

Junctions which are all connected to ground at 15 are also provided at 20, 21 and 22, junction 22 being connected to the noninverting input of amplifier 18 via a lead 23.

Junctions are also provided at 24 and 25. A resistor 26 is connected between junctions 21 and 24. A capacitor 27 is connected between junctions 22 and 24.

Junctions 24 and 25 are connected together via a lead 28.

Amplifier 18 has power input leads 29 and 30 connected respectively from junctions 31 and 25. A resistor 32 is connected between junctions 21 and 31. Junctions are also provided at 33, 34 and 35. Preamplifier 10 has an output lead 36. A resistor 37 is connected between junctions 33 and 34, junctions 34 and 35 being connected to the output lead 36 of amplifier 18. Junctions 17 and 33 are connected together by a lead 38. A capacitor 39 is connected between junctions 33 and 35. A diode 40 and a source of D.C. potential 41 are connected in series from a junction 45 to junction 31, diode 40 being poled to be conductive in a direction toward and being directly connected to junction 31. Source 41 has a positive pole 42 and a negative pole 43, negative pole 43 being connected to junction 45.

If desired, preamplifier 10 may have a reference output lead 44 connected from junctions 24, 25 and 45.

The equivalent circuit of crystal 30′ is generally an A.C. voltage source connected in series with a capacitor.

Capacitor 14 is a D.C. blocking capacitor. Resistors 32 and 26 from a voltage divider connected across source 41 having a tap which is junction 21. Resistors 32 and 26 thus determine the quiescent D.C. potential of the noninverting input of amplifier 18. Further, this input is referenced to ground at 15.

Capacitor 27 is bypass capacitor. It merely provides an effective A.C. ground for output lead 44 so that the A.C. current in lead 44 can be shunted to ground without passing through resistor 26. Resistor 37 is a feedback resistor. Capacitor 39 is a feedback capacitor. Resistor 37 is employed to maintain the inverting input of amplifier 18 at substantially the same average or D.C. potential as that of the noninverting input thereto.

Similarly, capacitor 39 is employed to maintain the inverting input of amplifier 18 at substantially the same A.C. potential as that of the noninverting input thereto.

Resistor 37 thus prevents amplifier drift. Capacitor 39 effectively creates an A.C. short circuit between both of the inputs to amplifier 18. Crystal 30′ is thus effectively short-circuited except for capacitor 14 which has a large capacitance relative to that of crystal 30′. The inputs to amplifier 18 are effectively short-circuited from an A.C. standpoint because the capacitor 39 passes the A.C. output signal of amplifier 18 to the inverting input thereof.

From the foregoing, it will be appreciated that resistor 37 and capacitor 39 provide negative D.C. and A.C. feedbacks, respectively, from amplifier 18 to the inverting input thereof.

Diode 40 is employed simply to prevent damage to the circuit of FIG. 2 if source 41 is connected with the wrong polarity.

It is an outstanding feature of the present invention that the effective A.C. short circuit between the inputs of amplifier 18 caused by the feedback capacitor 39 makes it possible to obtain a useful output while reducing the noise output thereof by a factor of ten. Testing has proved this to be true although this advantage is unexpected and cannot be explained theoretically.

It is also an outstanding feature of the invention that the output signal of crystal 30′ is not as susceptible to drift with temperature when the circuit of FIG. 2 is employed.

If desired, the component parts of the circuit of FIG. 2 may be as follows:

| | |
|---|---|
| Diode 40 | IN914 |
| Capacitor 14 | 0.01 microfarad, MYLAR Amperex C280 MAE/A10K |
| Resistor 26 | 100,000 ohms, 5 percent, ¼ watt CC resistor |
| Resistor 32 | 100,000 ohms, 5 percent, ¼ watt CC resistor |
| Capacitor 27 | 5.0 microfarad, 64 volts, Electrolytic Amperex C426 AR H5 |
| Resistor 37 | 4.7 megohms, 5 percent, ¼ watt CC resistor |
| Capacitor 39 | 80 picofarads (nominal) |
| Amplifier 18 | Operational Amplifier LM301A (dual in line, 8 pin) |

From the foregoing, it will be appreciated that the capacitance of capacitor 39 is quite small. This is an advantage because the A.C. output voltage appearing on lead 36 is generally directly proportional to the output voltage of crystal 30′ multiplied by the capacitance internal of crystal 30′ divided by the capacitance of capacitor 39.

The said A.C. short circuit of the input to amplifier 18 is accomplished because amplifier 18 may have a gain of several hundred thousand. The inverting input thereto is thus driven to the potential of that of the noninverting input thereto by the feedback resistor 37 and capacitor 39 to within, for example, $(1/500,000) \times (1/5,000) = 0.0002$ percent.

Preferably, the capacitance of capacitor 39 is less than the capacitance internal of crystal 30′. Further, preferably, the capacitance of capacitor 39 is one-fourth or one-eighth or less than the capacitance internal of crystal 30′. Crystal 30′ may have a nominal capacitance, for example, of 600 picofarads.

The circuit of FIG. 2 is preferably constructed in a manner to provide unity D.C. gain.

FIG. 1 may be identical to FIG. 12 of said copending U.S. Pat. application Ser. No. 187,948 with two exceptions. The first is that in copending U.S. Pat. application Ser. No. 187,948, an input circuit 106 replaces preamplifier 10. The second exception if that in the second copending U.S. Pat. application Ser. No. 187,948, the output of squarer 108 is also connected to the said input circuit 106. The last mentioned connection simply provides a power input to the input circuit. In the circuit of FIG. 2 herein, such power is supplied by source 41.

The structure and function of the densitometer of FIG. 1 is identical to that as described in said copending U.S. Pat. application Ser. No. 187,948, with the exception noted hereinbefore. Reference is hereby made to the last mentioned copending application for more detailed illustrations and descriptions of the blocks shown in FIG. 1, and for a more detailed description of the operation thereof. Suffice it to say here that driver 104 is a magnetostrictive driver which vibrates vane 20′. Vane 20′ is a rectangular vane of uniform thickness throughout its extent. Vane 20′ is supported at two opposite edges. At one opposite edge, crystal 30′ is located to be periodically compressed in synchronism with the vibration of vane 20′. The output signal of crystal 3′ is then amplified and impressed upon driver 104 by driver amplifier 124. The system of FIG. 1 is thus an electromechanical oscillator where the gain and delay of the loop is adequate to sustain oscillation of vane 20′.

As explained in the said copending U.S. Pat. application Ser. No. 187,948, the input to circuit 100 in FIG. 1 is a pulse train. The pulse repetition frequency of the input pulses to circuit 100 is then a function of the density of the fluid in which vane 20' is immersed. Circuit 100 then produces a D.C. output voltage which is directly proportional to the density of the fluid in which vane 20' is submerged, immersed or held.

The word "connected," as used herein, means that one point in a circuit is connected to another point therein either by a conductive lead or by a circuit component, or by both. In other words, the word "connected" is hereby defined to include a connection by a conductive lead only, or by a circuit component.

The word "densitometer" is hereby defined to include an instrument which produces an output that is indicated, used for control purposes or otherwise. In other words, the word "densitometer," as used herein, is not limited to an instrument which produces a visual indication of the density of a fluid.

Figure 3:
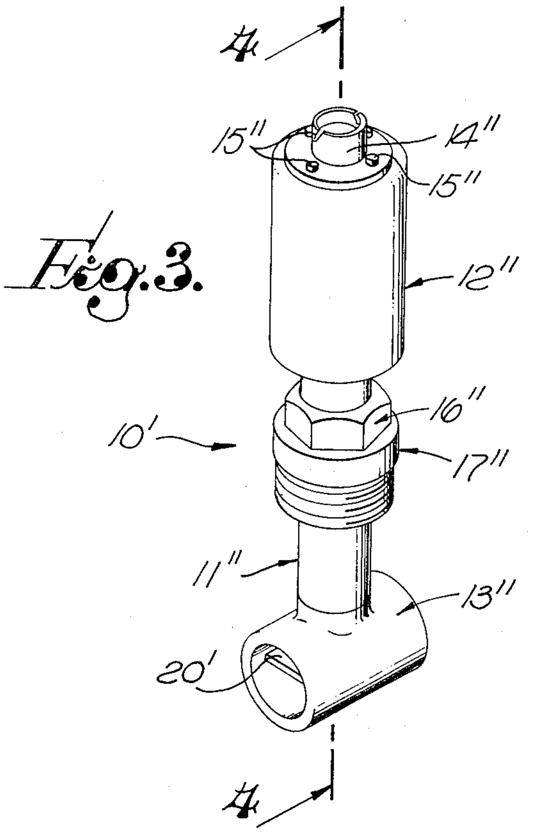
FIG. 3 is a perspective view of a densitometer probe constructed in accordance with the present invention.

In FIG. 3, the probe of the present invention is indicated at 10' having a shank 11'', a housing 12'' at its upper end, a tubular assembly 13'' at its lower end, and an electrical connector assembly 14'' at the upper end of housing 12'' fixed thereto by bolts 15''. Annular fittings 16'' and 17'' extend around shank 11'' for mounting probe 10' in a hollow cylindrical extension 18'' of a pipeline 19'' , as shown in FIG. 4.

Figure 4:
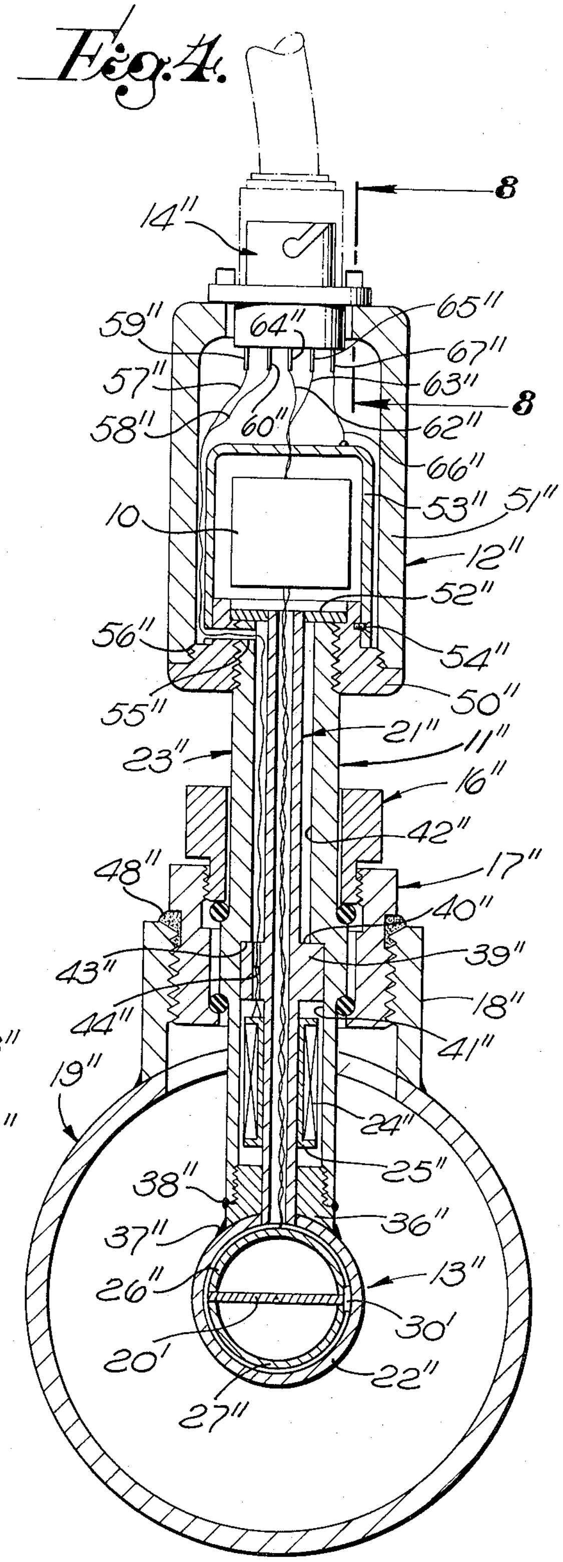
FIG. 4 is a sectional view of the probe taken on the line 4—4 shown in FIG. 3.

As shown in FIGS. 3 and 4, a stainless steel vane 20' is mounted in assembly 13'' in a position perpendicular to the axis of a hollow cylindrical magnetostrictive inner tube 21''. Vane 20', if desired, may be also mounted in a symmetrical position with respect to the axis of an outer sleeve 22'' which houses it.

Vane 20'may be a rectangular plate having flat and parallel upper and lower surfaces as shown in FIG. 4, and may otherwise have mutually normal surfaces forming a right parallelopiped.

Shank 11'' not only includes inner tube 21'', but an outer magnetic tube 23''. A driver coil or solenoid winding 24'' wound on a nylon bobbin 25'' is press fit onto the external surface of inner tube 21'' and located in a space between the tubes 21'' and 23'' toward the lower end of shank 11''. Coil 24'' is thus maintained in a substantially fixed position on inner tube 21'', although the same is not necessarily critical to the operation of the device of the present invention.

Figure 5:
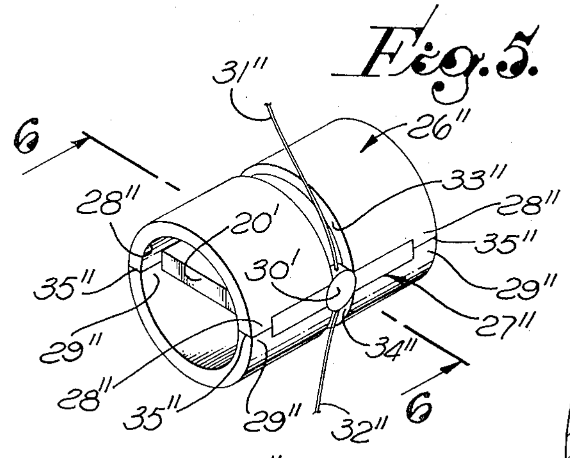
FIG. 5 is a perspective view of a group of component parts of the probe shown in FIG. 3.
Figure 6:
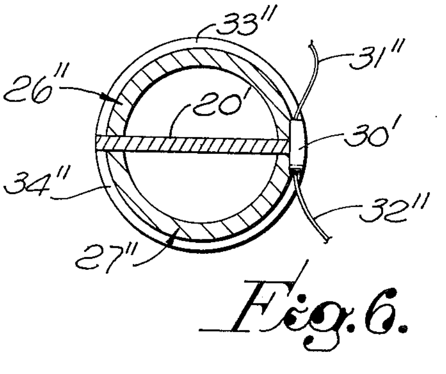
FIG. 6 is a transverse sectional view of the assembly taken on the line 6—6 shown in FIG. 5.

Vane 20' is supported between two half cylinders 26'' and 27'' as shown in FIGS. 4 and 5. According to the invention, the longitudinal edges of vane 20' are pressed together between half cylinders 26'' and 27'' with a pressure of, for example, 20,000 pounds per square inch because the assembly shown in FIG. 5 is inserted in sleeve 22 with an interference fit, sleeve 22 being heated prior to the said insertion.

Half cylinders 26'' has four projections 28'', and half cylinder 27'' has four projections 29''. Projections 28'' and 29'' serve to prevent longitudinal movement of vane 20' between half cylinder 26'' and half cylinder 27'' although the same is not likely due to the clamping pressure on vane 20' between half cylinder 26'' and half cylinder 27''.

Half cylinders 26'' and 27'', and vane 20' may be machined to have a flat or recess to receive piezoelectric crystal 30'. Crystal 30' has electrical leads 31'' and 32'' which extend around half cylinders 26'' and 27'' in grooves 33'' and 34'', respectively, to a point where they enter the hollow interior of inner tube 21''. This entry is made at the lower end of inner tube 21'', as shown in FIG. 4.

As shown in FIG. 5, projections 28'' and 29'' may have a slight separation at 35'' to insure that the pressure contact of half cylinders 26'' and 27'' on vane 20' is quite high due to the said intereference fit.

As shown in FIG. 4, a boss 36'' is welded at 37'' to sleeve 13'' in a fluid tight manner. Although the device of the present invention need not always be fluid tight throughout, a glass-to-metal seal or other seal may be provided inside inner tube 21'' for leads 31'' and 32''. Before the said intereference fit is provided, if desired, crystal 30', and those portions of leads 31'' and 32'' in grooves 33'' and 34'', respectively, may be potted with an epoxy. Further, after the interference fit has been effected, the entire unit when completely assembled may be treated further by applying a bonding agent around all of the structures inside sleeve 22''. Any conventional bonding process may be employed including, but not limited to, the application of a bonding agent sold under the name of "Locktite."

As stated previously, boss 36'' may be welded to sleeve 22'' at 37'' in a fluid tight manner. Further, outer tube 23'' may be threaded onto boss 36'' and welded thereto at 38'' in a fluid tight manner. For all practical purposes, boss 36'' may thus be considered an integral part of outer tube 23''. Boss 36'', for example, is also made of a magnetic material. All of the "magnetic materials" referred to herein may be any magnetic material including, but not limited to, stainless steel. However, inner tube 21'', although being magnetic, must also be magnetostrictive. Notwithstanding this limitation, it is to be noted that inner tube 21'' is employed to produce vibration, and if one feature of the present invention is used without another, the use of a magnetostrictive or magnetic material may not be required, and the invention still practiced.

Inner tube 21'' has an annular projection 39'' with a shoulder 40'' Outer tube 23'' has a lower bore 41'' separated from a smaller upper counterbore 42'' by an annular shoulder 43''. Shoulders 40'' and 43'' abut. From shoulder 40'' to the lower end of inner tube 21'', inner tube 21'' is always in axial compression. This is, inner tube 21'' is in compression when coil 24'' is energized, but inner tube 21'' is also in compression when coil 24'' is deenergized. Coil 24'' is energized with an alternating current which thus merely changes the degree of compression of inner tube 21''.

Figure 7:
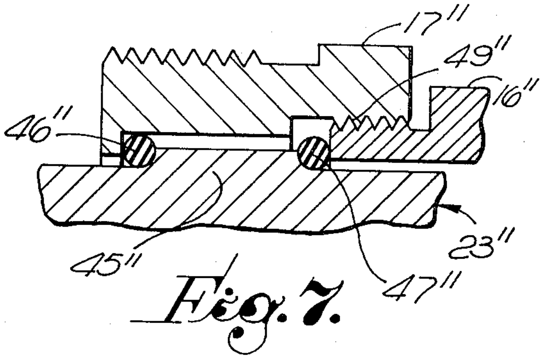
FIG. 7 is an enlarged longitudinal sectional view of a portion of the probe shown in FIG. 3.

Projection 39'' has a hole 44'' through which the electrical leads of coil 24'' can pass from the location of coil 24'' upwardly between tubes 21'' and 23''.

the manner in which probe 10' is mounted in pipeline 19'' is better illustrated in FIG. 7. In FIG. 7, note will be taken that outer tube 23'' has an outwardly extending radial projection 45'' on each side of which rubber O-rings 46'' and 47'' are compressed by fittings 16'' and 17''. Fitting 17'' is threaded into extension 18'' and sealed thereto by a conventional sealing compound 48'' shown in FIG. 4. In FIG. 7, note will be taken that fitting 16'' is threaded inside fitting 17'' at 49''. The amount O-rings 46'' and 47'' are compressed is, therefore, determined by the position of fitting 16''. That is, fitting 16'' is turned, for example, by a wrench, until the desired O-ring compression is reached.

From the construction illustrated in FIG. 7, note will be taken that only O-rings 46'' and 47'' contact outer tube 23'', and that, therefore, shank 11'' is never touched by either fitting 16'' or fitting 17''.

It is an advantage of the present invention that the construction of prove 10' is such that the leads from coil 24'' are kept magnetically separate from the leads from crystal 30'. This is true through a portion of housing 12'' as will be described. Housing 12'' has a fitting 50'' threaded onto outer tube 23''. A cylinder 51'' is threaded to fitting 50''. A washer 52'' is press fit and thereby fixed relative to fitting 50'' and inner tube 21''. Inner tube 21'' has an upper end which may be fixed relative to or slidable in washer 52'', as desired. However, preferably the external surface of inner tube 21'' at its upper end fits contiguous to or in contact with the surface of washer 52'' defining the hole therethrough. A shield 53'' made of a magnetic material may be fixed around fitting 50'' by one or two or more screws 54''. Outer tube 23'' has a radial hole 55'' therethrough through which the leads from coil 24'' pass. fitting 50'' has a hole 56'' therethrough in alignment with hole 55'' through which the leads from coil 24'' pass. From the outward radial extremity of hole 56'', the coil leads indicated at 57'' and 58'' pass upwardly between cylinders 51'' and shield 53'' and are connected respectively to pins 59'' and 60'' of the electrical connector 14''. Electrical connector 14'' may be a conventional five pin connector.

As stated previously, the leads 31'' and 32'' from crystal 30'' extend upwardly through the interior of inner tube 21''. At the upper end of inner tube 21'', as shown in FIG. 4, leads 31'' and 32'' are connected to the input of preamplifier 10. Leads 31''and 32'' thus extend outwardly through the upper opening in inner tube 21''.

Preamplifier 10 may be mounted on a conventional card or printed circuit board, if desired. Preamplifier 10 may be supported inside shield 53'' by any conventional means, if desired, or simply supported by the strength of leads 31'' and 32'', and output leads 62 and 63'' which are connected to pins 64'' and 65'' of connector 14'', respectively. A lead 66'' provides a ground connection from shield 53'' to the fifth pin 67'' of connector 14''.

Figure 8:
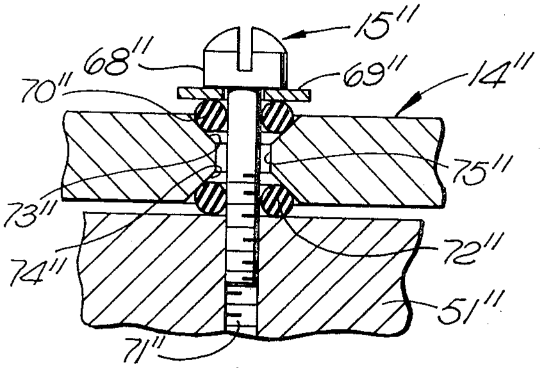
FIG. 8 is a longitudinal sectional view of a portion of mounting means for an electrical connector otherwise substantially fixed relative to the probe taken on the line 8—8 shown in FIG. 4.

The manner in which connector 14'' is mounted on cylinder 51'' is shown in FIG. 8. Only one bolt 15'' is shown in FIG. 8 since all bolts 15'' are similarly situated. In FIG. 8, bolt 15'' is shown having a head 68'', a washer 69'' under head 68'' , an O-ring 70'' under washer 69'', and a shank 71'' threaded into cylinder 51''. A second O-ring 72'' also extends around screw shank 71''. O-ring 70'' fits between the lower surface of washer 69'' and a countersunk frustoconical hole 73'' in connector 14''. O-ring 72'' fits between the upper surface of cylinder 51'' and another countersunk frustoconical hole 74'' in connector 14''. Holes 73'' and 74'' are connected by a bore 75''. From FIG. 8, it will be noted that all the structures shown therein may vibrate, but that the amount of vibration transmitted to connector 14'' may be quite small.

Figure 9:
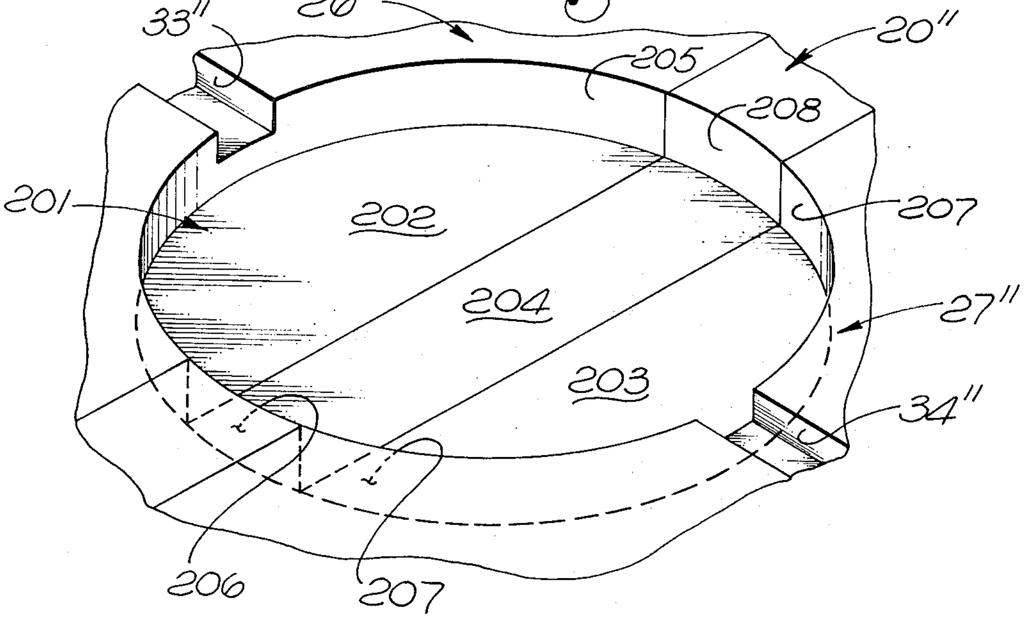
FIG. 9 is a greatly enlarged perspective view of a piezoelectric crystal recess shown in FIG. 4.

In FIG. 9, a recess 201 is shown in which crystal 30' is to be fixed. Recess 201 has a bottom surface portion 202 which is a portion of the surface of half cylinder 26''. A portion of the bottom surface of recess 201 is indicated at 203. Surface portion 203 similarly is a portion of the surface of half cylinder 27''.

The last portion of the bottom surface of recess 201 is indicated at Surface portion 203 is a portion of the surface of vane 20'.

The side surface of recess 201 may be prefectly cylindrical, if desired. This cylindrical surface is formed of portions 205, 206, 207 and 208. Portions 205 and 207 are also portions of the surface of half cylinders 26'' and 27'', respectively. Portions 206 and 208 are portions of the surface of vane 20'.

Figure 10:
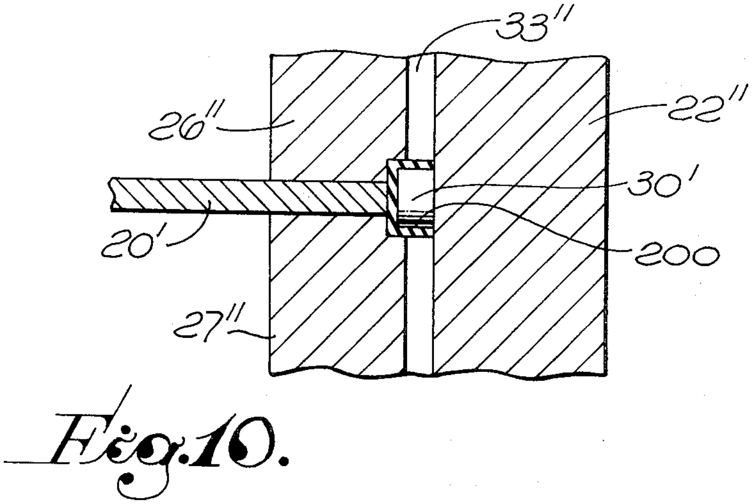
FIG. 10 is an enlarged view of a portion of FIG. 4.

FIG. 10 is a view which may be identical to a portion of FIG. 4 with the exception that the view of FIG. 10 is greatly enlarged. The view of FIG. 10 shows crystal 30' and the structure surrounding it. Note will be taken that a bonding agent, i.e., the epoxy, is illustrated at 200. Epoxy 200 bonds crystal 30' to vane 20' and to half cylinders 26'' and 27''.

The manner in which crystal 30' is bonded to the structure surrounding the same is not highly critical. However, preferably, crystal 30' is bonded to vane 20' by epoxy 200.

If desired, epoxy 200 may encapsulate crystal 30' and bond it to all the surface portions 202 and 208, inclusive. Epoxy may or may not bond crystal 30' to sleeve 22'', if desired.

If desired, crystal 30' may be maintained in continuous compression between epoxy 200 and sleeve 22''. On the other hand, periodic compression may be employed. Still further, sleeve 22'' may be in or out of continuous or period contact with crystal 30', but sleeve 22'' generally will be at least contiguous to crystal 30'.

If desired, vane 20' may be electron beam welded or otherwise better fixed to both of the half cylinders 26'' and 27''.

It is an outstanding, although unexpected, advantage of the present invention that the output of preamplifier 10 contains much less noise than prior art preamplifiers did. The following is a table of comparative test data:

| Drive Coil Frequency (Hz.) | Noise Output-Prior Art Preamplifier (mv.) | Noise Output-Preamplifier 10 (mv.) |
|---|---|---|
| 700 | 32 | 1.0 |
| 1,100 | 25 | .5 |
| 5,000 | 20 | .3 |
| 11,000 | 14 | .3 |

It is still another outstanding advantage of the present invention that the use of preamplifier 10 temperature compensates the densitometer. Specifically, when the prior art preamplifier was used, the amplitude of its A.C. output signal decreased when the temperature of probe 10' was increased. The case for this was unknown. It was, therefore, unexpected that the output of the amplifier 10 overcame this problem.

Since the invention of the preamplifier 10, applicant has developed a theory as to reason why the preamplifier makes the densitometer less sensitive or insensitive to temperature changes.

It is believed that the epoxy 200 softens as its temperature increases. There is, therefore, a poorer, i.e., less rigid, bond between crystal 30' and its surrounding structures and/or vane 20'. The partial failure of the bond thus reduces the efficiency with which the kinetic energy of vane 20' is transmitted to crystal 30'. Stated another way, the softened epoxy 200 acts as a dashpot and produces damping or absorbs energy which should be transmitted to crystal 30'.

It is believed that the foregoing problem is solved by employing a piezoelectric crystal, the A.C. output voltage of which increases with temperature. There are a number of conventional crystals which have this characteristic. One such crystal, for example, type PZT–5H, is sold by Gulton Industries as a Glennite Piezoceramic. Thus, crystal 30' is this type PZT–5H crystal.

Epoxy 200 may be any conventional epoxy. Epoxy 200 may, for example, also be that sold and packaged as an Epoxy Patch Kit 1C White by the Hysol Division of the Dexter Corporation. The single junction from which inputs are provided to both driver amplifier 124 and squarer 111 in FIG. 1 may be described as an "output junction."

What is claimed is:

1. A temperature compensated densitometer comprising: a probe including support means and vibratable structure mounted thereon; first means mounted on said support means to vibrate said structure, said first means having an input lead and being actuable in response to receipt of an input signal on said first means input lead; second means having an output lead, said second means being adapted to sense vibration of said structure and to produce an A.C. output signal on said output lead thereof in synchronism with vibration of said structure; a bonding agent substantially fixing said second means to said structure to transmit the vibration of said structure to said second means; an output junction; third means including a preamplifier having input and output leads, said preamplifier input lead being connected from said second means output lead; fourth means connecting the output lead of said preamplifier to said output junction; fifth means connecting said output junction to said first means input lead, said structure and said first, second, third, fourth and fifth means forming a closed loop electro-mechanical oscillator having a gain adequate to sustain oscillation of said structure; and utilization means connected from the output of said third means, said bonding agent being adapted to soften as its temperature increases and to damp vibration of said second means, said second means producing an A.C. output voltage the amplitude of which increases with increasing temperature.

2. The invention as defined in claim 1 wherein said second means includes a piezoelectric crystal.

3. The invention as defined in claim 2, wherein said bonding agent includes an epoxy.

4. The invention as defined in claim 1, wherein said bonding agent includes an epoxy.

* * * * *